US011743064B2

(12) United States Patent
Cheung

(10) Patent No.: US 11,743,064 B2
(45) Date of Patent: Aug. 29, 2023

(54) PRIVATE COLLABORATION SPACES FOR COMPUTING SYSTEMS

(71) Applicant: Meta Platforms Technologies, LLC, Menlo Park, CA (US)

(72) Inventor: Vincent Charles Cheung, San Carlos, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 223 days.

(21) Appl. No.: 16/673,803

(22) Filed: Nov. 4, 2019

(65) Prior Publication Data
US 2021/0135895 A1 May 6, 2021

(51) Int. Cl.
| | |
|---|---|
| *H04L 12/18* | (2006.01) |
| *G02B 27/01* | (2006.01) |
| *G06F 3/01* | (2006.01) |
| *G06T 19/00* | (2011.01) |
| *G06V 20/10* | (2022.01) |
| *G06V 40/16* | (2022.01) |

(52) U.S. Cl.
CPC ........ *H04L 12/1822* (2013.01); *G02B 27/017* (2013.01); *G06F 3/017* (2013.01); *G06T 19/006* (2013.01); *G06V 20/10* (2022.01); *G06V 40/172* (2022.01)

(58) Field of Classification Search
CPC ... H04L 12/1822; G02B 27/017; G06F 3/017; G06K 9/00288; G06K 9/00664; G06T 19/006; G06V 40/172; G06V 20/10
See application file for complete search history.

(56) References Cited

U.S. PATENT DOCUMENTS

| | | | |
|---|---|---|---|
| 9,135,599 B2* | 9/2015 | Westerinen | ......... G06F 3/04847 |
| 9,372,543 B2* | 6/2016 | Lo | ............................ H04L 67/22 |
| 2012/0044248 A1* | 2/2012 | Elsberg | .................... G06F 30/13 |
| | | | 345/419 |
| 2013/0174213 A1* | 7/2013 | Liu | ........................ G06T 19/006 |
| | | | 726/1 |

(Continued)

OTHER PUBLICATIONS

Martella, et al. (Mar, 2014). From proximity sensing to spatio-temporal social graphs. In 2014 IEEE International Conference on Pervasive Computing and Communications (PerCom) (pp. 78-87). IEEE, https://ieeexplore.ieee.org/document/6813947.*

*Primary Examiner* — Mohamed A. Wasel
*Assistant Examiner* — Timothy Sowa
(74) *Attorney, Agent, or Firm* — Shumaker & Sieffert, P.A.

(57) ABSTRACT

This disclosure describes a computing system that automatically detects users in visual proximity and adds the users to a private collaboration space enabling the users to share digital content. In one example, the computing system includes a video processing engine configured to detect, from first image data representative of a first physical environment that includes a second user, the second user, wherein the first image data is captured by an image capture system of a head-mounted display (HMD) worn by a first user. The computing system also includes a collaboration application configured to add, in response to detection of the second user, the second user to a set of users associated with a private collaboration space in which the set of users access shared digital content, wherein the set of users includes the first user.

20 Claims, 8 Drawing Sheets

(56) References Cited

U.S. PATENT DOCUMENTS

| | | | | |
|---|---|---|---|---|
| 2013/0293468 | A1* | 11/2013 | Perez | G06F 21/32 |
| | | | | 345/158 |
| 2014/0368537 | A1* | 12/2014 | Salter | G06F 3/011 |
| | | | | 345/633 |
| 2015/0142891 | A1* | 5/2015 | Haque | H04W 12/06 |
| | | | | 709/204 |
| 2016/0093108 | A1* | 3/2016 | Mao | A63F 13/825 |
| | | | | 345/633 |
| 2016/0299563 | A1* | 10/2016 | Stafford | G06F 3/011 |
| 2017/0282062 | A1* | 10/2017 | Black | A63F 13/428 |
| 2017/0365102 | A1* | 12/2017 | Huston | G02B 27/017 |
| 2018/0005441 | A1* | 1/2018 | Anderson | G06T 19/006 |
| 2018/0047216 | A1* | 2/2018 | Mullins | G06T 19/006 |
| 2018/0096519 | A1* | 4/2018 | Tokubo | A63F 13/211 |
| 2018/0107835 | A1* | 4/2018 | Clement | G07F 17/3211 |
| 2018/0157333 | A1* | 6/2018 | Ross | H04L 67/38 |
| 2018/0190032 | A1* | 7/2018 | Barnett | G06Q 50/01 |
| 2018/0314484 | A1* | 11/2018 | Pahud | A63F 13/213 |
| 2018/0341811 | A1* | 11/2018 | Bendale | G06K 9/3233 |
| 2018/0357826 | A1* | 12/2018 | Ross | G06K 9/00671 |
| 2019/0056791 | A1* | 2/2019 | Holz | G02B 27/0172 |
| 2019/0286406 | A1* | 9/2019 | Chen | G02B 27/017 |
| 2019/0304406 | A1* | 10/2019 | Griswold | G09G 5/14 |

* cited by examiner

PRIVATE COLLABORATION SPACES FOR COMPUTING SYSTEMS

TECHNICAL FIELD

This disclosure generally relates to computing systems and, more particularly, to sharing digital content using computing systems.

BACKGROUND

Digital content includes files, messages, pictures, digital whiteboards, digital objects, artificial reality content, etc. Digital content is typically generated using a computing device and may be shared with multiple users via a network, e.g., using an application that facilitates sharing of digital content.

Artificial reality systems are a form of computing system that are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may include a number of different types of artificial reality content, including see-through AR, overlay AR, completely-generated content, generated content combined with captured content (e.g., real-world video and/or images), or other types. During operation, the user typically interacts with the artificial reality system to select content, launch applications or otherwise configure the system.

SUMMARY

This disclosure describes example computing systems and devices that provide automated, visually-driven access control to private collaboration spaces for sharing digital content. For example, systems and devices are described that automatically detect users in visual proximity and add the users to a private collaboration space enabling the users to share digital content. As one example, an image capture system of a head-mounted display (HMD) or camera-enabled mobile device, such as an artificial reality mobile device, worn or held by a first user may capture images of other users that are in visual proximity to the first user and within a field of view of the image capture system. Another user may be visually proximate to the first user by being physically proximate to the first user or by virtue of an image of the other user being visible in a display device that is physically proximate to the first user.

In response to detecting at least a second user in the captured images, the computing system controls access to a private digital collaboration space, such as by automatically initiating the creation of the private collaboration space (e.g., on the computing system or other system) that includes the first user and the second user. As another example, the computing system may automatically add the second user to an existing private collaboration space associated with the first user. The first user and the second user use the private collaboration space to share digital content with one another. The sharing of digital content may include sending messages, pictures, files, or artificial reality content between the first user and the second user; cooperatively editing a digital whiteboard; cooperatively editing a digital object such as a document, spreadsheet, or artificial reality content; concurrently viewing artificial reality content; or other sharing of digital content. In other examples, the computing system may, upon detecting the second user within the images and based on a mode of operation, automatically remove the second user from one or more private collaboration spaces associated with the first user.

In some examples, the computing system generates a visual proximity graph of visual connectedness in which users can be added to the private collaboration space even if not every user can see every other user. For example, a first device for a first user in a first room may receive, via a conferencing system, images for visual detection of a second user located in a second room. A third user may also be located in the first room but unable to see the second user. Based on the visual proximity graph, the computing system may add all of the users to a private collaboration space because the first user can visually detect both the second and third users.

The techniques of this disclosure provide one or more technical advantages that enable at least one practical application. For instance, the computing system enables visually proximate users to easily engage in a shared digital space and share digital content by automatically adding such users to a private collaboration space based on visual detection. The computing system may further, in some examples, facilitate large-scale collaboration of many users, e.g., attendees at a concert or sporting event, that are not all visually proximate to each other but are transitively visually proximate to one another, to share readily and easily share digital content regarding their collectively shared experience, for instance.

In one example, this disclosure describes a computing system comprising a video processing engine configured to detect, from first image data representative of a first physical environment that includes a second user, the second user, wherein the first image data is captured by an image capture system of a head-mounted display (HMD) worn by a first user; and a collaboration application configured to add, in response to detection of the second user, the second user to a set of users associated with a private collaboration space in which the set of users access shared digital content, wherein the set of users includes the first user.

In another example, this disclosure describes a method comprising detecting, by a computing system, from first image data representative of a first physical environment that includes a second user, the second user, wherein the first image data is captured by an image capture system of a head-mounted display (HMD) worn by a first user; and adding, by the computing system, in response to detection of the second user, the second user to a set of users associated with a private collaboration space in which the set of users to access shared digital content, wherein the set of users includes the first user; and presenting, by the computing system in response to receiving digital content from the first user, the digital content to the second user.

In another example, this disclosure describes a non-transitory computer-readable medium comprising instructions for causing processing circuitry of a computing system to perform operations comprising detect, from first image data representative of a first physical environment that includes a second user, the second user, wherein the first image data is captured by an image capture system of a head-mounted display (HMD) worn by a first user; and add, in response to detection of the second user, the second user to a set of users associated with a private collaboration space in which the set of users to access shared digital content, wherein the set of users includes the first user; and present, in response to receiving digital content from the first user, the digital content to the second user.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters denote like elements throughout the figures and text.

DETAILED DESCRIPTION

Figure 1A:
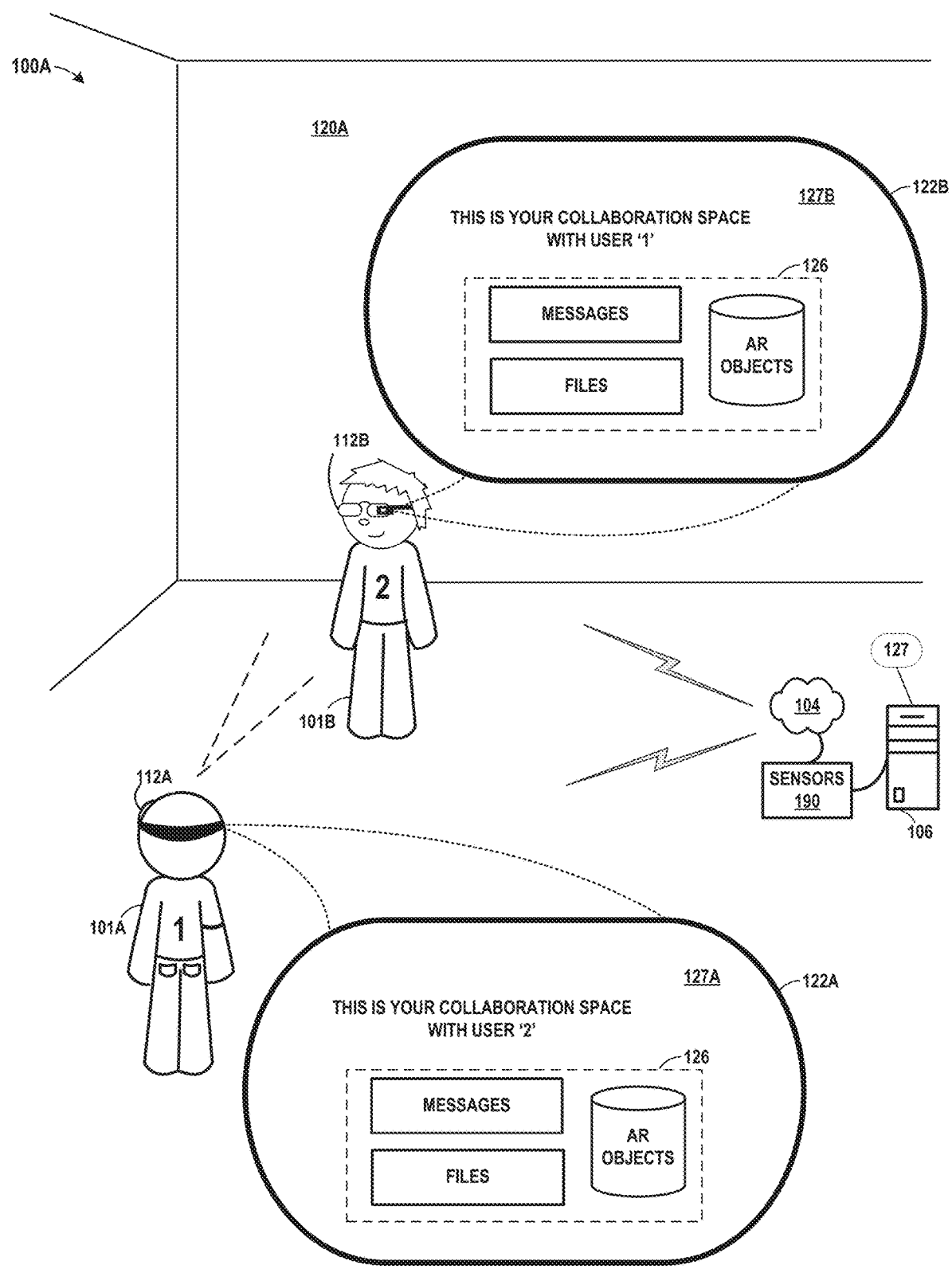
FIG. 1A is a conceptual diagram illustrating an example computing system that automatically provides visually-driven access control (e.g., creation, user addition and/or removal) to private collaboration spaces, in accordance with one or more aspects of the present disclosure.

FIG. 1A is a conceptual diagram illustrating an example computing system that automatically provides visually-driven access control (e.g., creation, user addition and/or removal) to private collaboration spaces, in accordance with one or more aspects of the present disclosure. In the example of FIG. 1A, computing system 100A is depicted within physical environment 120A. In FIG. 1A, physical environment 120A is shown as a room that includes user 101A and user 101B and a number of real world or physical objects, including head-mounted displays (HMDs) 112A, 112B worn by users 101A, 101B, respectively. User 101B is visually proximate to user 101A in that user 101B is within a field of view of an active image capture system associated with user 101A. In this example, the image capture system associated with user 101A is one or more forward-facing cameras of HMD 112A. In other example, an image capture system may include a digital camera, a camera-enabled mobile device or tablet device, a front-facing camera of a tabletop personal assistant device, a front-facing camera of a laptop computer, etc. In such examples, the user may not wear an HMD but instead hold the device.

In FIG. 1A, computing system 100A includes HMDs 112A, 112B, console 106, and one or more sensors 190. Although in some examples external sensors 190 may be stationary devices (e.g., affixed to the wall), in other examples one or more of external sensors 190 may be included within HMD 112, within a user device (not shown), or within any other device or system. As shown in FIG. 1A, HMD 112A is typically worn by user 101A and includes an electronic display and optical assembly for presenting artificial reality content 122A to the user. In addition, HMD 112A may include one or more sensors (e.g., accelerometers) for tracking motion of the HMD and may include one or more image capture devices, e.g., cameras, line scanners and the like, for capturing image data of the surrounding environment. HMD 112B may be similar to HMD 112A and but is typically worn by user 101B. Computing system 100A may be an artificial reality system in some examples.

Computing system 100A may use information obtained from a real-world or physical three-dimensional (3D) environment to render artificial reality content 122A for display by HMD 112A, thereby presenting the content to user 101A. In the example of FIG. 1A, user 101A views the artificial reality content 122A constructed and rendered by an artificial reality application executing on console 106 and/or HMD 112A. Likewise, computing system 100A may render artificial reality content 122B for display by HMD 112B, thereby presenting the content to user 101B.

In other examples, artificial reality content 122A, 122B may correspond to content rendered pursuant to a social interaction application, a video conferencing application, collaboration application, an alternative world application, a navigation application, an educational application, gaming application, training or simulation applications, augmented reality application, virtual reality application, or other type of application. In some examples, content displayed to users 101A, 101B may be non-artificial reality content or other type of digital content, such as files, messages, pictures, digital whiteboards, and/or digital objects.

In the example of FIG. 1A, console 106 is shown as a single computing device, such as a gaming console, workstation, a desktop computer, or a laptop. In other examples, console 106 may be distributed across a plurality of computing devices, such as a distributed computing network, a data center, or a cloud computing system. HMDs 112A, 112B, console 106, and external sensors 190, may, as shown in FIG. 1A, be communicatively coupled via network 104, which may be a wired or wireless network, such as Wi-Fi, a mesh network or a short-range wireless communication medium. In some examples, users 101A, 101B may use one or more controllers (not shown) to perform gestures or other actions. In such an example, such controllers may be in communication with corresponding HMDs 112A, 112B using near-field communication or short-range wireless communication such as BLUETOOTH, using wired communication links, or using another type of communication links. Although HMDs 112A, 112B are shown in FIG. 1A as being in communication with, e.g., tethered to or in wireless communication with, console 106, in some implementations either or both of HMDs 112A, 112B operate as a standalone, mobile artificial reality system. As such, some or all functionality attributed to console 106 in this disclosure may be distributed among one or more user devices, such as one or more instances of HMD 112A, 112B. As such, some or all functionality attributed to computing system 100A in this disclosure may be distributed among one or more user devices, such as one or more instances of HMD 112A, 112B, and/or one or more console devices, such as console 106.

In some examples, an artificial reality application executing on console 106 and/or HMD 112A in FIG. 1A presents artificial reality content to user 101A based on a current viewing perspective for user 101. That is, in FIG. 1A, the artificial reality application constructs artificial content by tracking and computing pose information for a frame of reference for HMD 112A, and uses data received from HMD 112A, external sensors 190, and/or cameras 192 to capture 3D information within the real-word, physical 3D environment 120A, such as motion by user 101A and/or tracking information with respect to user 101A and one or more physical objects, for use in computing updated pose information for a corresponding frame of reference of HMD 112A (or another user device). As one example, the artificial reality application may render, based on a current viewing perspective determined for HMD 112A, artificial reality content 122A having one or more artificial reality content objects overlaid upon images of physical or real-world objects (e.g., user 101B). Further, from the perspective of HMD 112A, computing system 100A renders artificial reality content based upon the estimated positions and poses for user 101A and other physical objects. The above description with respect to HMD 112A may likewise apply for HMD 112B.

In the example of FIG. 1A, an in accordance with one or more aspects of the present disclosure, computing system 100A may process images generated by the image capture system of HMD 112A to detect user 101B that is present in physical environment 120A along with user 101A. User 101B is in this way visually proximate to user 101A. Computing system 100A (and other computing systems described herein) may detect user 101B processing images to detect the user's face using facial recognition techniques, which may include application of convolutional neural networks to identify user 101B. Computing system 100A may generate a facial fingerprint. In some examples, computing system 100A may detect user 101B by processing images to detect an identifying marker or badge associated with the user. For example, user 101B may be wearing a badge with a QR or other code that maps to a user identifier for the user. In some examples, computing system 100A may map the user identifier for user 101B to a user profile for user 101B stored to an identification database.

In response to detection of user 101B, computing system 100A automatically creates a private collaboration space 127. Computing system 100A automatically adds detected user 101B to the private collaboration space and also automatically adds user 101A based on user 101A's association with the image capture system of HMD 112A that generated the images. To add user 101B, computing system 100A may, for instance, add a reference to a user profile in an identification database for user 101B to a data structure associated with private collaboration space 127. In this way, computing system 100A links the user profile for user 101B to the private collaboration space 127.

A private collaboration space is exclusive to a set of users that are members of the private collaboration space, which can enable access to shared digital content 126, such as files, digital objects, digital whiteboards, text or other messages, artificial/virtual reality content, artificial reality objects, and the like, to all users that are members of the private collaboration space. The private collaboration space 127 is a collaboration environment for the users and may include a virtual environment or a repository of shared digital content, for instance. In some examples, private collaboration space 127 may be provided, at least in part, any application accessible to the users to interface with digital content, such as a shared music, video, gaming, or streaming application. Data for private collaboration space 127 may include a list of members, the digital content, applications for generating, uploading, modifying, deleting, or otherwise interacting with digital content. This data may be stored by computing system 100A, e.g., at any or each of the HMDs 112A, 112B, at console 106, or at a storage system (not shown in FIG. 1A). Computing system 100A, e.g., HMD 112B, presents shared digital content to the added user 101B.

Computing system 100A generates one or more interfaces for accessing and interacting with the shared digital content of the private collaboration space 127. In the example of FIG. 1A, computing system 100A generates interface 127B output as artificial reality content 122B, and with which user 101B may interact with the private collaboration space 127. Interface 127B may include an indication of the identity of users that are members of the collaboration space. This indication may be text, as in FIG. 1A ("YOUR COLLABORATION SPACE WITH USER '1'"), pictures of the users, user names, or other indication. Computing system 100A generates interface 127A output as artificial reality content 122A, with which user 101A may interact with the private collaboration space 127. Interface 127A may include an indication of the identity of users that are members of the collaboration space. This indication may be text, as in FIG. 1A ("YOUR COLLABORATION SPACE WITH USER '2'"), pictures of the users, user names, or other indication.

Interface 127A enables user 101A to access and interact with shared digital content. Interface 127A may, for instance, allow user 101A to upload, modify, and delete digital content; access digital content and output the digital content for audio playback or video display; create or send new digital content; and so forth. Interface 127A may automatically provide, to user 101A, access to digital content uploaded, created, or otherwise added to private collaboration space 127 by user 101B, or other digital content associated with private collaboration space 127, because user 101A is a member of private collaboration space 127. Interface 127B provides functions similar to those described above with respect to interface 127A. Accordingly, interface 127B may automatically provide, to user 101B, access to digital content uploaded, created, or otherwise added to private collaboration space 127 by user 101A, or other digital content associated with private collaboration space 127, because user 101B is a member of private collaboration space 127.

Computing system 100A automatically creates and implements applications for private collaboration space 127 in this way to enable visually proximate users to quickly and easily engage in a shared digital space and share digital content by automatically adding such users to a private collaboration space based on visual detection.

Figure 1B:
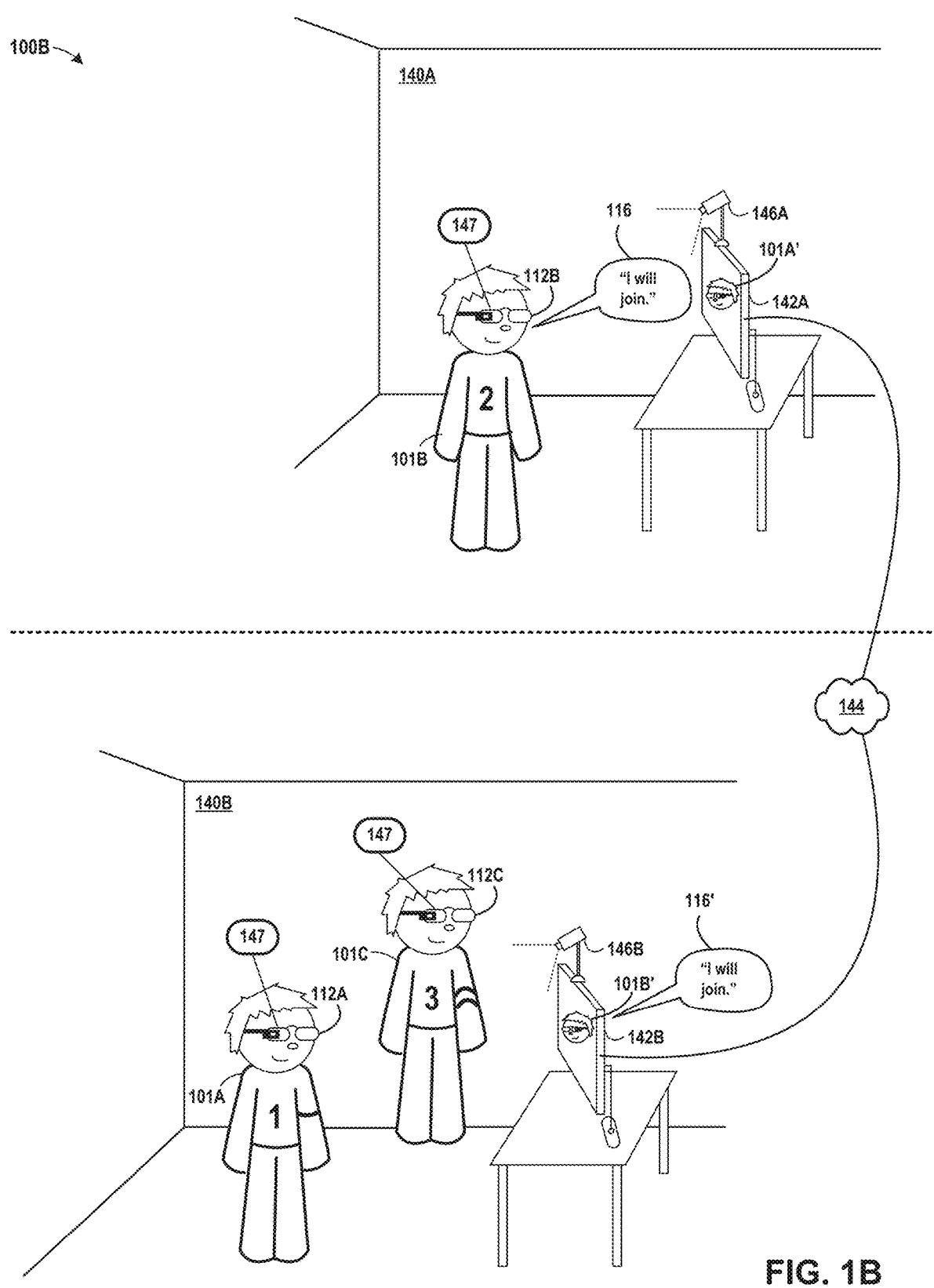
FIG. 1B is a conceptual diagram illustrating another example computing system that automatically provides visually-driven access control to private collaboration spaces, in accordance with one or more aspects of the present disclosure.

FIG. 1B is a conceptual diagram illustrating another example computing system that automatically provides visually-driven access control to private collaboration spaces, in accordance with one or more aspects of the present disclosure. In the example of FIG. 1B, computing system 100B is depicted within physical environments 140A and 140B. In FIG. 1B, physical environment 140A is shown as a room that includes user 101B and a number of real world or physical objects, including HMD 112B worn by user 101B. Physical environment 140B is shown as a room that includes users 101A and 101C and a number of real world or physical objects, including HMDs 112A, 112C worn by respective users 101A, 101C.

In FIG. 1B, HMDs 112A-112C are not shown in communication with a console, as in FIG. 1A, but instead operate as standalone artificial reality systems that enable users 101A-101C to participate in private collaboration spaces.

Physical environments 140A, 140B are such that users 101A and 101C are not able to see user 101B. Physical environments 140A, 140B are geographically distributed and may be separate rooms in the same building, in separate buildings, in different cities, and so forth. A video conferencing system includes video conferencing devices 142A, 142B located in respective physical environments. Each of video conferencing devices 142A, 142B includes a corresponding one of image capture systems 146A, 146B and a display. Video conferencing devices 142A, 142B may also include corresponding microphones and speakers. Video conferencing devices 142A, 142B may, as shown in FIG. 1B, be communicatively coupled via network 104, which may be a wired or wireless network, such as Wi-Fi, a wired LAN, and/or the Internet.

Video conferencing devices 142A, 142B are shown in FIG. 1B as operating a video conference for the users 101A-101C. As part of the video conference, image capture system 146B generates image data that includes images of user 101A, which is in the field of image capture system 146B. Video conferencing device 142B sends a representation of the image data to video conferencing device 142A, which displays images 101A' of user 101A based on the image data. Likewise, image capture system 146A generates image data that includes images of user 101B, which is in the field of image capture system 146A. Video conferencing device 142A sends a representation of the image data to video conferencing device 142B, which displays images 101B' of user 101B based on the image data. While illustrated and described as application-specific video conferencing devices, video conferencing devices 142A, 142B may each be any computing device that enables video conferencing, such as a laptop or desktop computer, television, mobile device or tablet device, etc.

Although user 101A and user 101B are not physically proximate to one another, user 101A and user 101B are visually proximate to one another because user 101A and user 101B are able to see images of each other in respective video conferencing devices 142A, 142B. That is, user 101A can see images 101B' of user 101B and user 101B can see images 101A' of user 101A. User 101C is not in the field of view of image capture system 146B and is therefore not visually proximate to user 101B.

In the example of FIG. 1B, in accordance with one or more aspects of the present disclosure, computing system 100B may process images generated by the image capture system of HMD 112A to detect user 101C that is physically and visually proximate to user 101A in physical environment 140B. In response to detection of user 101C, computing system 100B automatically creates a private collaboration space 147. Computing system 100B automatically adds detected user 101B to private collaboration space 147 and also automatically adds user 101A based on user 101A's association with the image capture system of HMD 112A that generated the images.

In the example in FIG. 1B, computing system 100B adds detected user 101B to private collaboration space 147 only in response to a confirmation 116 from user 101B. That is, computing system 100B does not add detected user 101B until user 101B approves their addition to private collaboration space 147. In FIG. 1B, user 101B issues confirmation in the form of a verbal utterance ("I will join"), which is captured by video conference device 142A and transmitted for output by video conference device 142B as confirmation 116'. In other examples, user 101B may confirm addition to private collaboration space 147 using a gesture, e.g., thumbs-up, hand-wave, or some other configuration, movement, or orientation of users 101B's body or part thereof; by entering user input to an interface using a user input device, e.g., a controller, keyboard, or mouse; or using another type of confirmation.

In some examples, computing system 100B adds detected user 101B only after waiting a threshold amount of time after the detection of user 101B. For example, detected user 101B may need to be in the field of view of the image capture system and detected within generated image data for a threshold amount of time before the user 101B is added to the private collaboration or user 101A is prompted to add the user 101B to the private collaboration space.

In some examples, computing system 100B has an add user mode in which, for instance, user 101A must first cause computing system 100B to enter the add user mode before computing system 100B will attempt to detect users and automatically add the users to private collaboration spaces. User 101A may cause computing system 100B to enter the add user mode using a gating input in the form of a gating gesture or gating utterance, for instance.

The above examples described with respect to computing system 100B may also apply with respect to computing system 100A.

A user can be a member of multiple different private collaboration spaces. In some examples, if user 101A is a member of multiple private collaboration spaces, computing system 100B outputs a request to user 101A to request input of which of the private collaboration spaces a detected user should be added. In the example of FIG. 1B, for instance, user 101A may be a member of private collaboration space 147 with user 101B. In response to computing system 100B detecting user 101C, HMD 112A may output a request that user 101A specify whether users 101C should be added to private collaboration space 147 or a new private collaboration space should be created to include users 101A and 101C (not user 101B). In the latter case, user 101A would be a member of two private collaboration spaces.

Figure 1C:
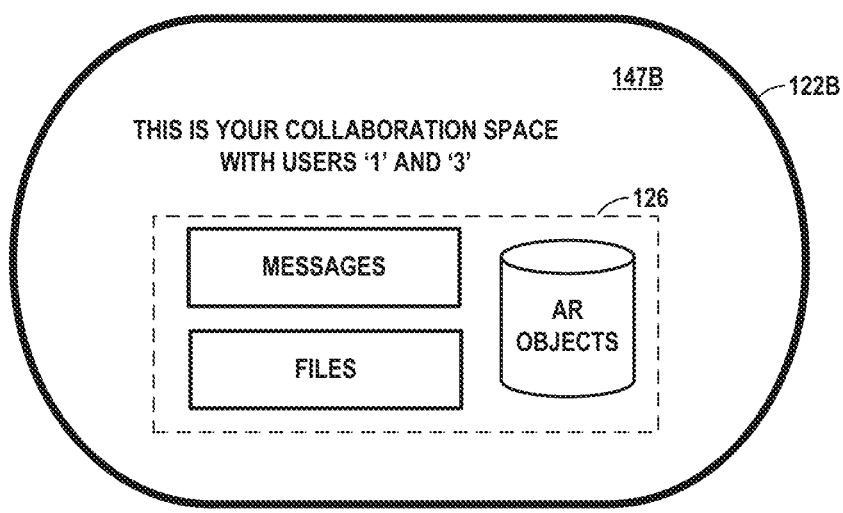
FIG. 1C is a conceptual diagram illustrating an example interface that may be rendered and displayed by an example computing device, in accordance with one or more aspects of the present disclosure.
Figure 1D:
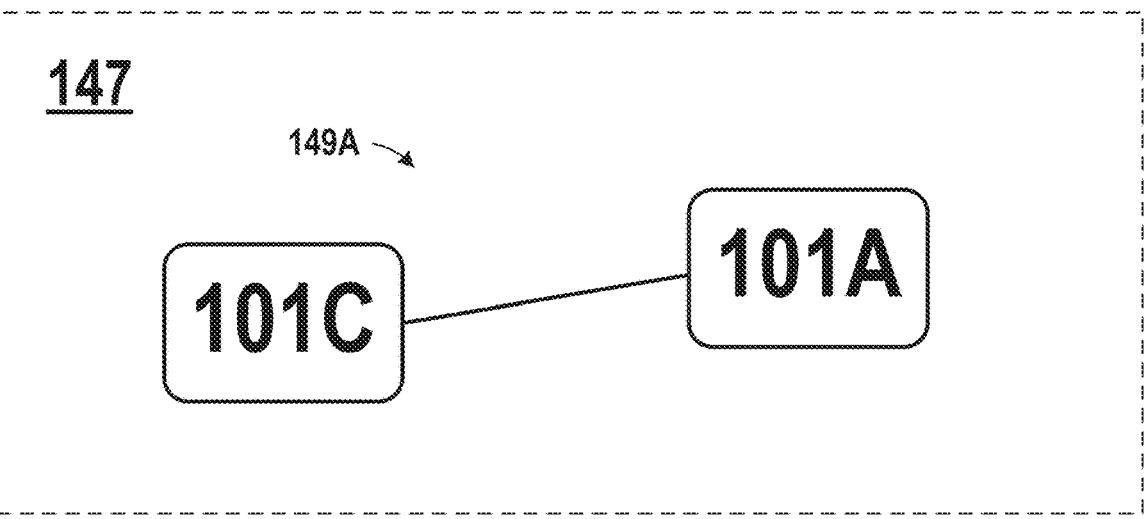
FIGS. 1D-1E depict visual proximity graphs that may be automatically generated in response to visually-detected users, in accordance with one or more aspects of the present disclosure.

FIG. 1D illustrates a visual proximity graph 149A of visual connectedness for private collaboration space 147 including users 101A, 101C. Computing system 100B may generate visual proximity graph to user for determining transitive visual proximity among users 101. Visual proximity graph 149A illustrates users 101A and 101C as being in direct visual proximity with a solid line. In some examples, edges for visual proximity graphs 149A-149B described herein may have associated values that indicate a type of visual proximity for the endpoint nodes of the edge, e.g., direct line of sight, via a video conference, or transitive with one or more intermediary users that have visual proximity to the users represented by the endpoint nodes of the edge. Different types of visual proximity may constrain the types of digital content sharing that can occur between endpoint nodes of the edge. As one example, users having direct line of sight visual proximity may share all digital content. However, users having only transitive visual proximity may only be able to share messages.

Subsequently to computing system 100B adding users 101C and 101A to private collaboration space 147, computing system 100B may process further images generated by the image capture system of HMD 112A to detect user 101B. In response to detection of user 101B, computing system 100B automatically adds detected user 101B to private collaboration space 147. The addition of users 101B, 101C to private collaboration space 147 may occur in any order.

Figure 1E:
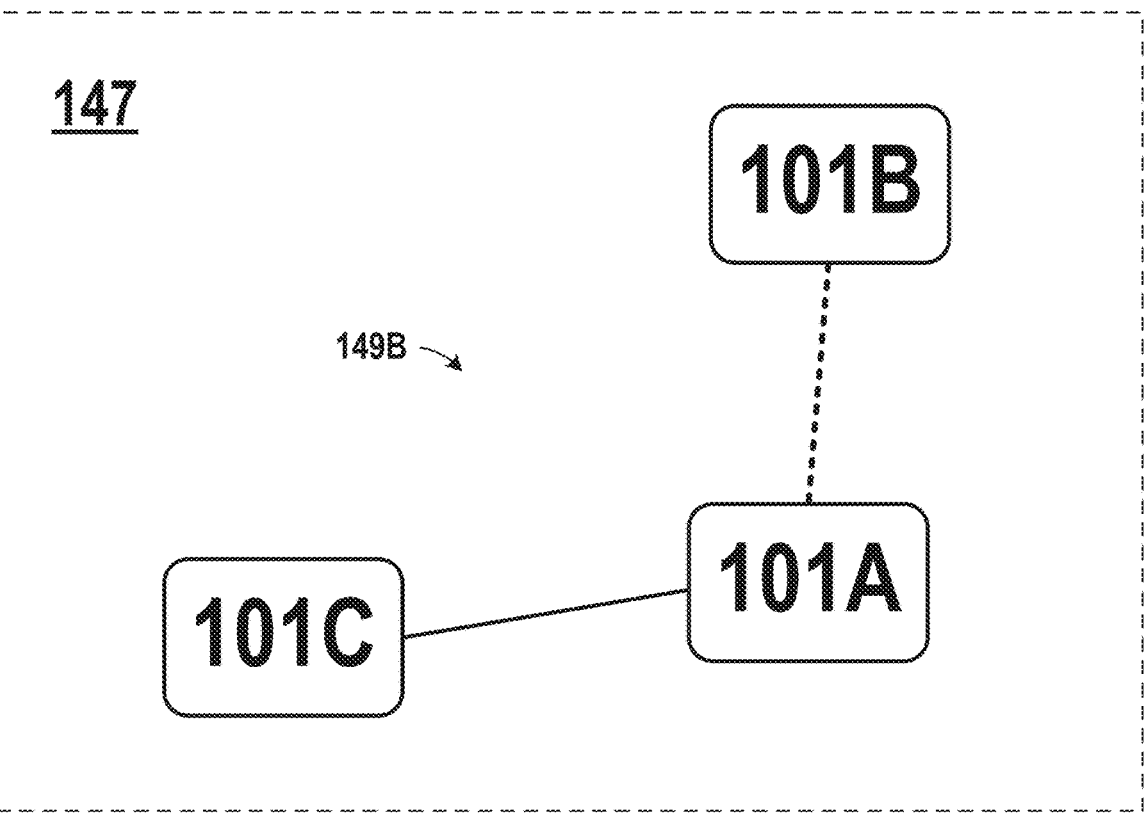

FIG. 1E illustrates a visual proximity graph 149B modified from visual proximity graph 149A to show the addition of user 101B to private collaboration space 147. In visual proximity graph 149B, not every user can see every other user. In the example of FIG. 1B, users 101A and 101C can see one another, but user 101B may be unable to see user 101C because user 101C is not in the field of view for image capture system 146B. In some examples, based on the visual proximity graph, computing system 100B may automatically add all of users 101A-101C to private collaboration space 147 because the computing system 100B can visually detect both user 101B and user 101C from images generated by the image capture system of HMD 112A.

Computing system 100B generates one or more interfaces for accessing and interacting with the shared digital content of private collaboration space 147. In the example of FIG. 1C, computing system 100B generates interface 147B output as artificial reality content 122B, and with which user 101B may interact with the private collaboration space 147. Interface 147B in this example includes an indication of the identity of users that are members of the collaboration space as text ("YOUR COLLABORATION SPACE WITH USERS '1' and '3'"). Interface 147B may operate similarly to interfaces 127A, 127B described with respect to FIG. 1A.

Computing system 100B automatically creates and implements applications for private collaboration space 147 in this way to enable visually proximate users to quickly and easily engage in a shared digital space and share digital content by automatically adding such users to a private collaboration space based on visual detection and/or transitive visual proximity.

Figure 2:
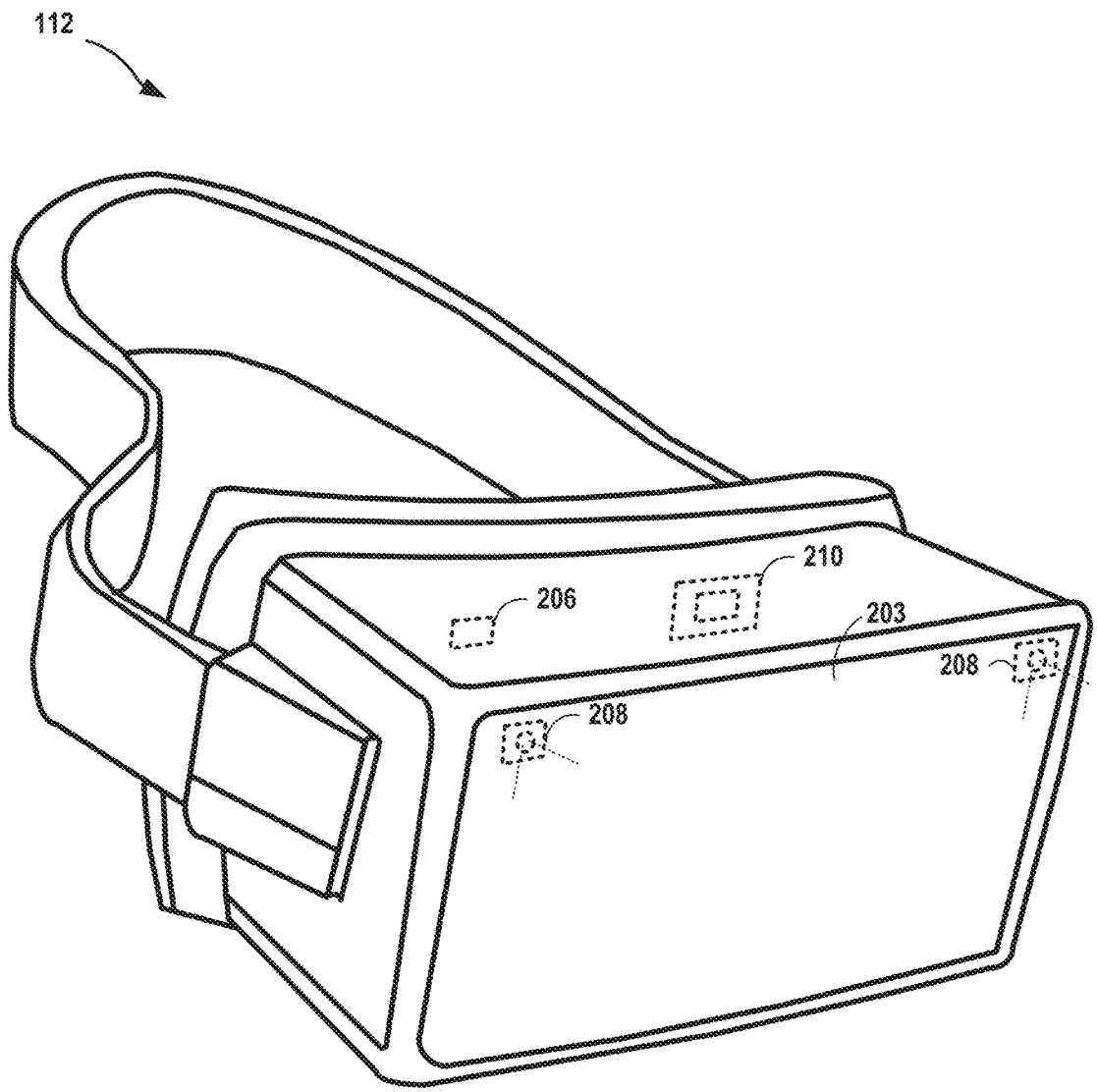
FIG. 2 is an illustration depicting an example head-mounted display configured to operate in accordance with one or more aspects of the present disclosure.

FIG. 2 is an illustration depicting an example HMD configured to operate in accordance with the techniques of the disclosure. HMD 112 of FIG. 2 may be an example of any HMD 112A-112C of FIGS. 1A-1C. HMD 112 may be part of an artificial reality system and/or computing systems 100A, 100B or may operate as a stand-alone, mobile artificial reality system configured to implement the techniques described herein. HMD 112 may include a mobile device (e.g., a smart phone) that is removable from the body of the HMD 112. HMD 112 may pair with other devices for co-processing, interfaces, etc.

In the example of FIG. 2, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user.

In the example of FIG. 2, HMD 112 further includes one or more sensors 206, such as one or more accelerometers (also referred to as inertial measurement units or "IMUs") that output data indicative of current acceleration of HMD 112, GPS sensors that output data indicative of a location of HMD 112, radar or sonar sensors that output data indicative of distances of the HMD 112 from various objects, or other sensors that provide indications of a location or orientation of HMD 112 or other objects within a physical 3D environment. Moreover, HMD 112 may include one or more integrated sensor devices 208, such as a microphone, audio sensor, a video camera, laser scanner, Doppler radar scanner, depth scanner, or the like, configured to output audio or image data representative of a surrounding real-world environment. HMD 112 includes an internal control unit 210, which may include an internal power source and one or more printed-circuit boards having one or more processors, memory, and hardware to provide an operating environment for executing programmable operations to process sensed data and present artificial-reality content on display 203. Internal control unit 210 may be part of a removable computing device, such as a smart phone.

Although illustrated in FIG. 2 having a specific configuration and structure, HMD 112 may take any of a number of forms. For example, in some implementations, HMD 112 might resemble glasses or may have a different form. Also, although HMD 112 may be configured with a display 203 for presenting representations or images of physical content, in other examples, HMD 112 may include a transparent or partially transparent viewing lens, enabling see-through artificial reality (i.e., "STAR"). Further, HMD may implement features based on wave guides or other STAR technologies.

In accordance with the techniques described herein, control unit 210 is configured to automatically create and implement applications for private collaboration spaces to enable visually proximate users to quickly and easily engage in a shared digital space and share digital content by automatically adding such users to a private collaboration space based on visual detection.

For example, control unit 210 may detect, based on image data captured by sensor devices 208, a user present or otherwise represented in the image data. Control unit 210 may include subunits, engines, and applications (described in further detail below with respect to FIGS. 3-4), which can execute software for processing the sensed data and/or images to detect other users represented in the image data. Control unit 210 may further execute a collaboration application automatically create a new private collaboration space and to automatically add newly detected users, visually proximate to users in the private collaboration space, to the private collaboration space to allow member users of the private collaboration space to share digital content and collaborate on tasks using shared digital content.

Control unit 210 may perform other functions described in further detail with respect to other components of a computing system, artificial reality system, or HMD elsewhere in this disclosure.

Figure 3:
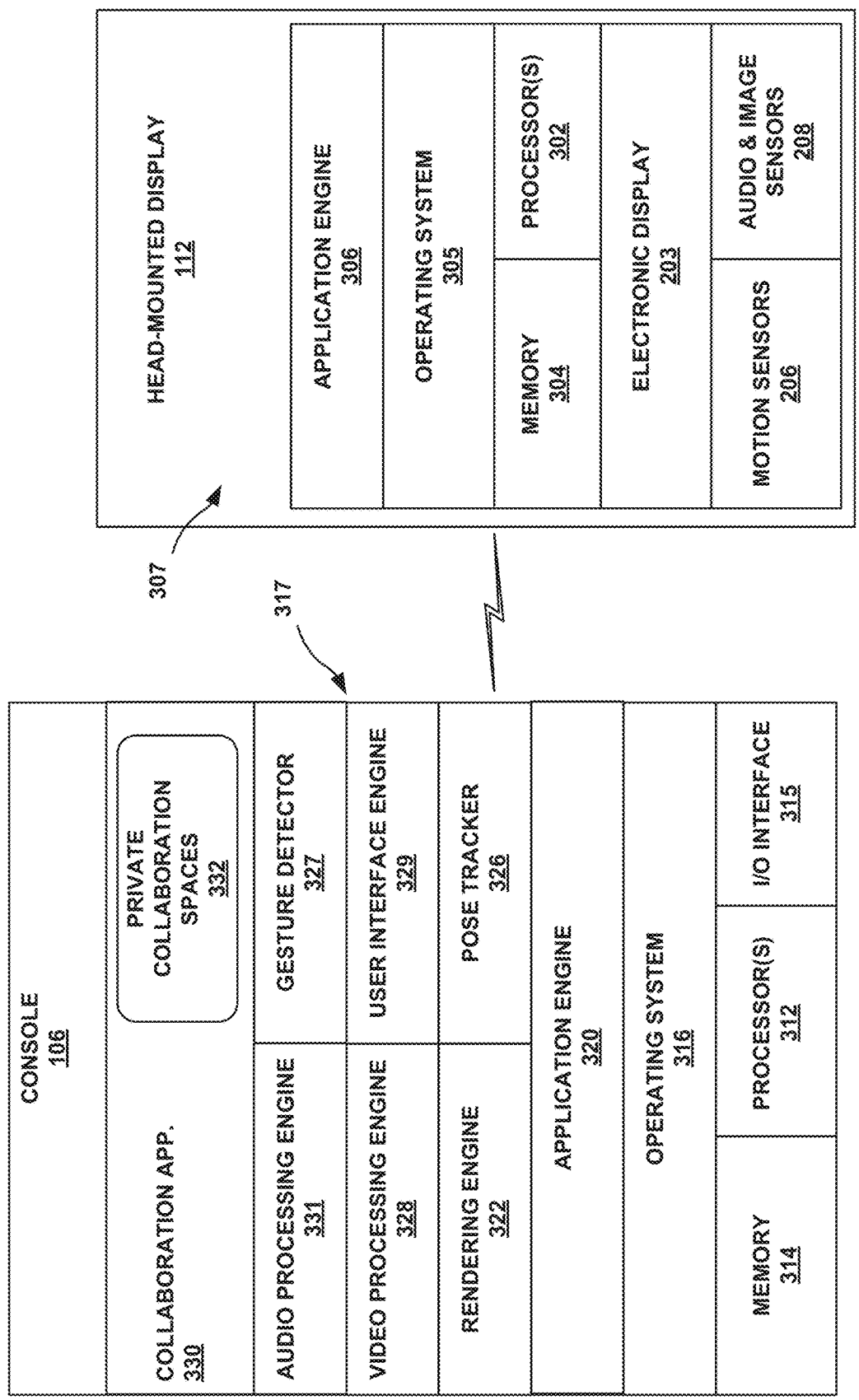
FIG. 3 is a block diagram showing example implementations of an example console and an example head-mounted display, in accordance with one or more aspects of the present disclosure.

FIG. 3 is a block diagram showing example implementations of an example console and an example HMD, in accordance with one or more aspects of the present disclosure. Although the block diagram illustrated in FIG. 3 is described with reference to HMD 112A of FIGS. 1A-1B, in other examples, functions and/or operations attributed to HMD 112 may be performed by a different device or system, such as a user device as referenced in connection with FIG. 1A-1B.

In the example of FIG. 3, HMD 112 includes one or more processors 302 and memory 304 that, in some examples, provide a computer platform for executing an operation system 305, which may be an embedded and near (or seemingly-near) real-time multitasking operating system. In turn, operating system 305 provides a multitasking operating environment for executing one or more software components 307. Processors 302 are coupled to electronic display 203 (see FIG. 2). HMD 112 is shown including motion sensors 206 and sensor devices 208 coupled to processor 302, but in other examples, HMD 112 may include neither or merely either of motion sensors 206 and sensor devices 208. In some examples, processors 302 and memory 304 may be separate, discrete components. In other examples, memory 304 may be on-chip memory collocated with processors 302 within a single integrated circuit. The memory 304, processors 302, operating system 305, and application engine 340 components may collectively represent an example of internal control unit 210 of FIG. 2.

HMD 112 may include user input devices, such as a touchscreen or other presence-sensitive screen example of electronic display 203, microphone, controllers, buttons, keyboard, and so forth. Application engine 306 may generate and present a login interface via electronic display 203. A user of HMD 112 may use the user interface devices to input, using the login interface, login information for the user. HMD 112 may send the login information to console 106 to log the user into the artificial reality system.

Operating system 305 provides an operating environment for executing one or more software components, which include application engine 306, which may be implemented as any type of appropriate module. Application engine 306 may be an artificial reality application having one or more processes. The artificial reality application may be, e.g., a collaboration application, a teleconference application, a gaming application, a navigation application, an educational application, or training or simulation application, for example.

Console 106 may be implemented by any suitable computing system capable of interfacing with user devices (e.g., HMDs 112) of an artificial reality system. In some examples, console 106 is a single computing device, such as a workstation, a desktop computer, a laptop. In some examples, at least a portion of console 106, such as processors 312 and/or memory 314, may be distributed across one or more computing devices, a cloud computing system, a data center, or across a network, such as the Internet, another public or private communications network, for instance, broadband, cellular, Wi-Fi, and/or other types of communication networks, for transmitting data between computing systems, servers, and computing devices.

In the example of FIG. 3, console 106 includes one or more processors 312 and memory 314 that provide a computer platform for executing an operating system 316. In turn, operating system 316 provides an operating environment for executing one or more software components 317. Processors 312 are coupled to I/O interface 315, which provides one or more I/O interfaces for communicating with external devices, such as a keyboard, game controllers, display devices, image capture devices, and the like. Moreover, I/O interface 315 may include one or more wired or wireless network interface cards (NICs) for communicating with a network, such as network 104 (see, e.g., FIG. 1A). Each of processors 302, 312 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314 may comprise any form of memory for storing data and executable software instructions, such as random-access memory (RAM), read-only memory (ROM), programmable read-only memory (PROM), erasable programmable read-only memory (EPROM), electronically erasable programmable read-only memory (EEPROM), and/or Flash memory. Software components 317 of console 106 operate to provide an overall artificial reality application. In the example of FIG. 3, software components 317 be represented by modules as described herein, including collaboration application 330, application engine 320, rendering engine 322, pose tracker 326, gesture detector 327, video processing engine 328, audio processing engine 331, and user interface engine 329.

Application engine 320 includes functionality to provide and present an artificial reality application, e.g., a teleconference application, a gaming application, a navigation application, an educational application, training or simulation applications, and the like. Application engine 320 and application engine 340 may cooperatively provide and present the artificial reality application in some examples. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Rendering engine 322 renders the artificial content constructed by application engine 320 for display to a user in accordance with current pose information for a frame of reference, typically a viewing perspective of HMD 112, as determined by pose tracker 326. Based on the current viewing perspective, rendering engine 322 constructs the 3D, artificial reality content which may be overlaid, at least in part, upon the physical 3D environment in which HMD 112 is located. During this process, pose tracker 326 may operate on sensed data received from HMD 112, such as movement information and user commands, and, in some examples, data from external sensors 190 (as shown in FIG. 1A) to capture 3D information within the physical 3D environment, such as motion by HMD 112, a user thereof, a controller, and/or feature tracking information with respect to the user thereof.

Pose tracker 326 determines information relating to a pose of a user within a physical environment. Pose tracker 326 may localize HMD 112 to a map for the area.

User interface engine 329 may perform functions relating to generating a user interface when, e.g., a user performs a gesture or action. User interface engine 329 may receive information from application engine 320, pose tracker 326, and/or video processing engine 328 and, based on that information, generate a user interface. User interface engine 329 may output, to rendering engine 322, information about the user interface so that rendering engine 322 may present the user interface, overlaid on other physical and/or artificial reality content, at display 203 of HMD 112. Accordingly, user interface engine 329 may receive information from and output information to one or more other modules, and may otherwise interact with and/or operate in conjunction with one or more other engines or modules of console 106.

Image sensors 208 represent an image capture system that generates image data for a scene, which may include users or images of users. HMD 112 sends the image data to console 106 for processing.

Audio processing engine 331 receives audio data generated by audio sensors 208. Audio processing engine 331 processes the audio data using, e.g., Natural Language Processing, to detect commands, phrases, or other utterances in the audio data by users. Audio processing engine 331 may, according to techniques of this disclosure, detect a confirmation uttered by a user that indicates confirmation of user addition to a private collaboration space. An audio library (not shown) may specify, for the utterances, conditions that, if met, cause collaboration application 330 to trigger a particular action or response. For example, the confirmation utterance may cause collaboration application 330 to add a detected user to a private collaboration space.

Gesture detector 327 analyzes image data generated by image sensors 208 to discern movements/motions, configurations, positions, and/or orientations of objects (e.g., hands, arms, wrists, fingers, palms, thumbs) of users to identify one or more gestures performed by users. Gesture detector 327 may, according to techniques of this disclosure, detect a confirmation gesture that indicates confirmation of user addition to a private collaboration space.

Gesture detector 327 may track movement, including changes to position and orientation, by comparing motion vectors of the objects of the image data to one or more entries in a gesture library (not shown) to detect a gesture or combination of gestures performed by a user. Various entries in the gesture library may each define a gesture as a series or pattern of motion, such as a relative path or spatial translations and rotations of a user's hand, specific fingers, thumbs, wrists and/or arms. Some entries in the gesture library may each define a gesture as one or more of a movement, stasis, configuration, position, and/or orientation of the hand (or individual digits thereof) at a particular time, or over a period of time. The gesture library may include other examples of gesture types, as well, in some instances. Each of the entries in gesture library may specify, for the defined gesture or combination of gestures, conditions that, if met, cause collaboration application 330 to trigger a particular action or response. For example, the confirmation gesture may cause collaboration application 330 to add a detected user to a private collaboration space. As another example, a gating gesture may cause collaboration application 330 to enter an add user mode.

Video processing engine 328 processes image data generated by image sensors to attempt to detect a user whose physical attributes (e.g., face, hands, retina), associated identification code, or other associative attribute are represented in the images. Video processing engine 328 may execute facial detection, QR or other code detection and interpretation, or other video processing to detect a user within the image data.

As described herein, collaboration application 330 provides automated, visually-driven access control to private collaboration spaces associated with the user of HMD 112. For example, collaboration application 330 may, responsive to video processing engine 328 detecting one or more users within a current field of view of HMD 112, automatically create a new one of private collaboration spaces 332 associated with the user of 112 to be used for sharing content with the detected users (participants). Collaboration application 330 may automatically remove (i.e., prevent access by) the detected users(s) from one or more private collaboration spaces 332 associated with the user of HMD 112. As other examples, collaboration application 330 may, in response to video processing engine 328 detecting a user, add, the user to a set of users associated with an existing one or more of private collaboration spaces 332. The user of HMD 112 may, in some examples, direct the desired operation of collaboration application 330 by user input, such as by performing one or more gestures associated with respective modes of operation (creation of new private collaboration spaces 332, addition of a detected user(s) to an existing collaboration space, and removal of a detected user(s) from an existing collaboration space.) The private collaboration space gives the user access to digital content shared by other members of the private collaboration space. Collaboration application 330 can create a new private collaboration space 332 for the detected user and a user of HMD 112 of FIG. 3. Collaboration application 330 may receive uploaded digital content for a private collaboration space, present interfaces for accessing or manipulating digital content, and present digital content to members of private collaboration spaces. Although shown locally within console 105, private collaboration spaces 332 may be digitally maintained in one or more remote servers (i.e., in the "cloud") and/or distributed between console 106, HMD 112 and/or the remote servers.

Collaboration application 330 may alternatively, or additionally, perform other operations attributed to computing systems 100A, 100B elsewhere in this disclosure.

In some examples, such as in the manner described in connection with FIG. 4, some or all of the functionality attributed to pose tracker 326, rendering engine 322, user interface engine 329, audio processing engine 331, video processing engine 328, application engine 320, gesture detector 327, and collaboration application 330 may be performed by HMD 112.

Figure 4:
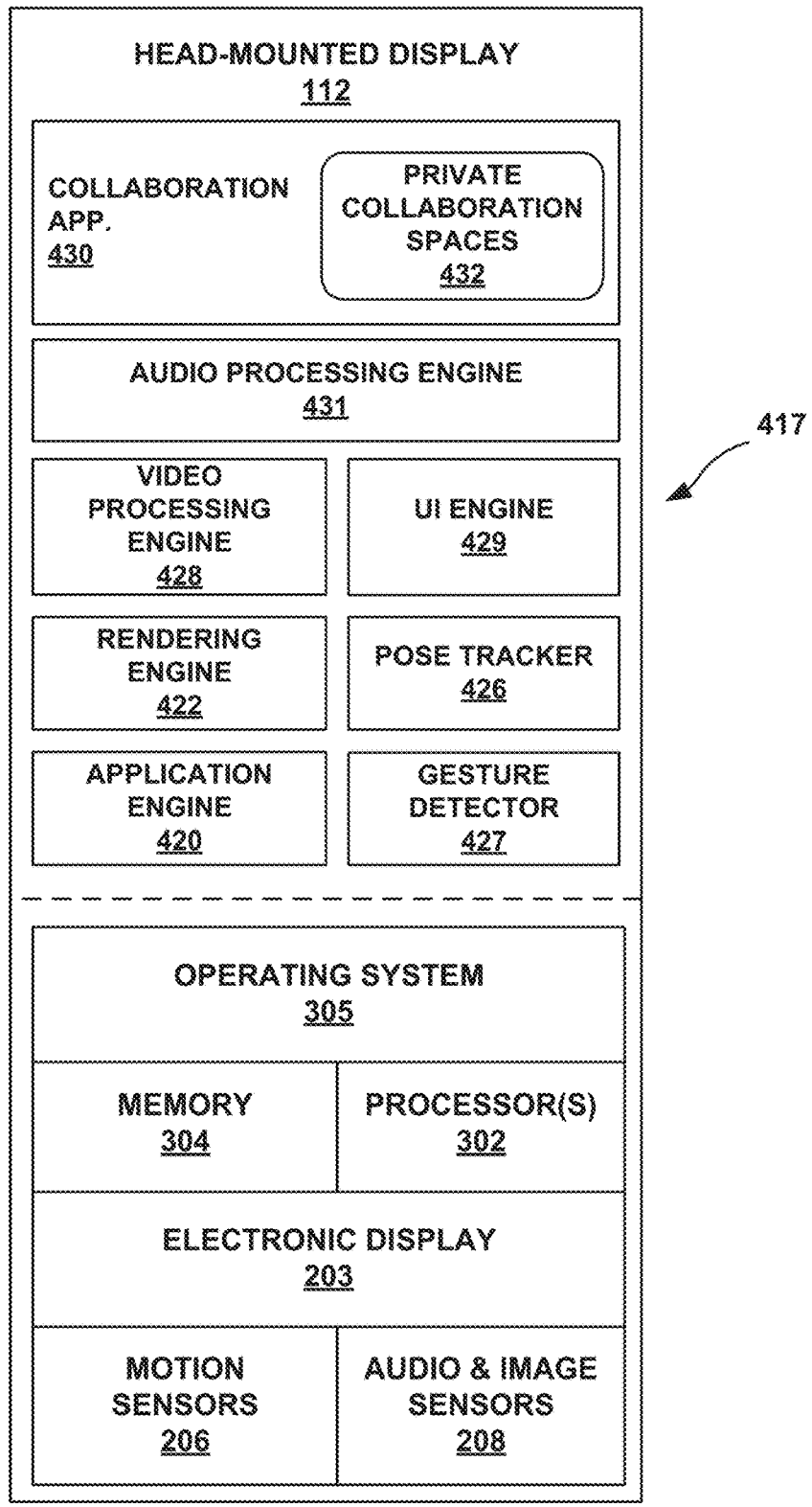
FIG. 4 is a block diagram depicting an example of a user device for an artificial reality system, in accordance with one or more aspects of the present disclosure.

Modules or engines illustrated in FIG. 3 (e.g., pose tracker 326, rendering engine 322, user interface engine 329, audio processing engine 331, video processing engine 328, application engine 320, pose tracker 326, gesture detector 327, and collaboration application 330), FIG. 4, and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

FIG. 4 is a block diagram depicting an example of a user device for an artificial reality system, in accordance with one or more aspects of the present disclosure. In FIG. 4, HMD 112 may operate as a stand-alone device, i.e., not tethered to a console, and may represent an instance of any of the user devices, including HMDs 112 described in connection with FIG. 1A, FIG. 1B, FIG. 1C, FIG. 2, and FIG. 3. Although HMD 112 illustrated in FIG. 4 is primarily described as a head-mounted device, the device illustrated in FIG. 4 may, in other examples, be implemented as a different device, such as tablet computer, for instance. In the specific example of FIG. 4, however, and in a manner similar to FIG. 3, HMD 112 includes one or more processors 302 and memory 304 that, in some examples, provide a computer platform for executing an operation system 305, which may be an embedded multitasking operating system. In turn, operating system 305 provides an operating environment for executing one or more software components 417. Moreover, processor(s) 302 are coupled to electronic display 203, motion sensors 206, and sensor devices 208.

In the example of FIG. 4, software components 417 operate to provide an overall artificial reality application. In this example, software components 417 include pose tracker 426, rendering engine 422, user interface engine 429, audio processing engine 431, video processing engine 428, application engine 420, gesture detector 427, and collaboration application 430. In various examples, software components 417 operate similar to the counterpart components of console 106 of FIG. 3 (e.g., pose tracker 326, rendering engine 322, user interface engine 329, audio processing engine 331, video processing engine 328, application engine 320, gesture detector 327, and collaboration application 330).

One or more aspects of FIG. 4 may be described herein within the context of other Figures, including FIG. 1A, FIG. 1B, FIG. 1C, and FIG. 2.

Video processing engine 428 processes image data generated by image sensors to attempt to detect a user whose physical attributes (e.g., face, hands, retina), associated identification code, or other associative attribute are represented in the images. Video processing engine 428 may execute facial detection, QR or other code detection and interpretation, or other video processing to detect a user within the image data.

As described herein, collaboration application 430 provides automated, visually-driven access control to private collaboration spaces associated with the user of HMD 112. For example, collaboration application 430 may, responsive to video processing engine 428 detecting one or more users within a current field of view of HMD 112, automatically create a new one of private collaboration spaces 432 associated with the user of 112 to be used for sharing content with the detected users (participants). Collaboration application 430 may automatically remove (i.e., prevent access by) the detected users(s) from one or more private collaboration spaces 432 associated with the user of HMD 112. As other examples, collaboration application 430 may, in response to video processing engine 428 detecting a user, add, the user to a set of users associated with one of private collaboration spaces 432. The user of HMD 112 may, in some examples, direct the desired operation of collaboration application 430 by user input, such as by performing one or more gestures associated with respective modes of operation (creation of new private collaboration spaces 432, addition of a detected user(s) to an existing collaboration space, and removal of a detected user(s) from an existing collaboration space.) The private collaboration space gives the user access to digital content shared by other members of the private collaboration space. Collaboration application 430 can create a new private collaboration space 432 for the detected user and a user of HMD 112 of FIG. 3. Collaboration application 430 may receive uploaded digital content for a private collaboration space, present interfaces for accessing or manipulating digital content, and present digital content to members of private collaboration spaces. Although shown locally within HMD 112, private collaboration spaces 432 may be digitally maintained in one or more remote servers (i.e., in the "cloud") and/or distributed between HMD 112 and/or the remote servers.

Figure 5:
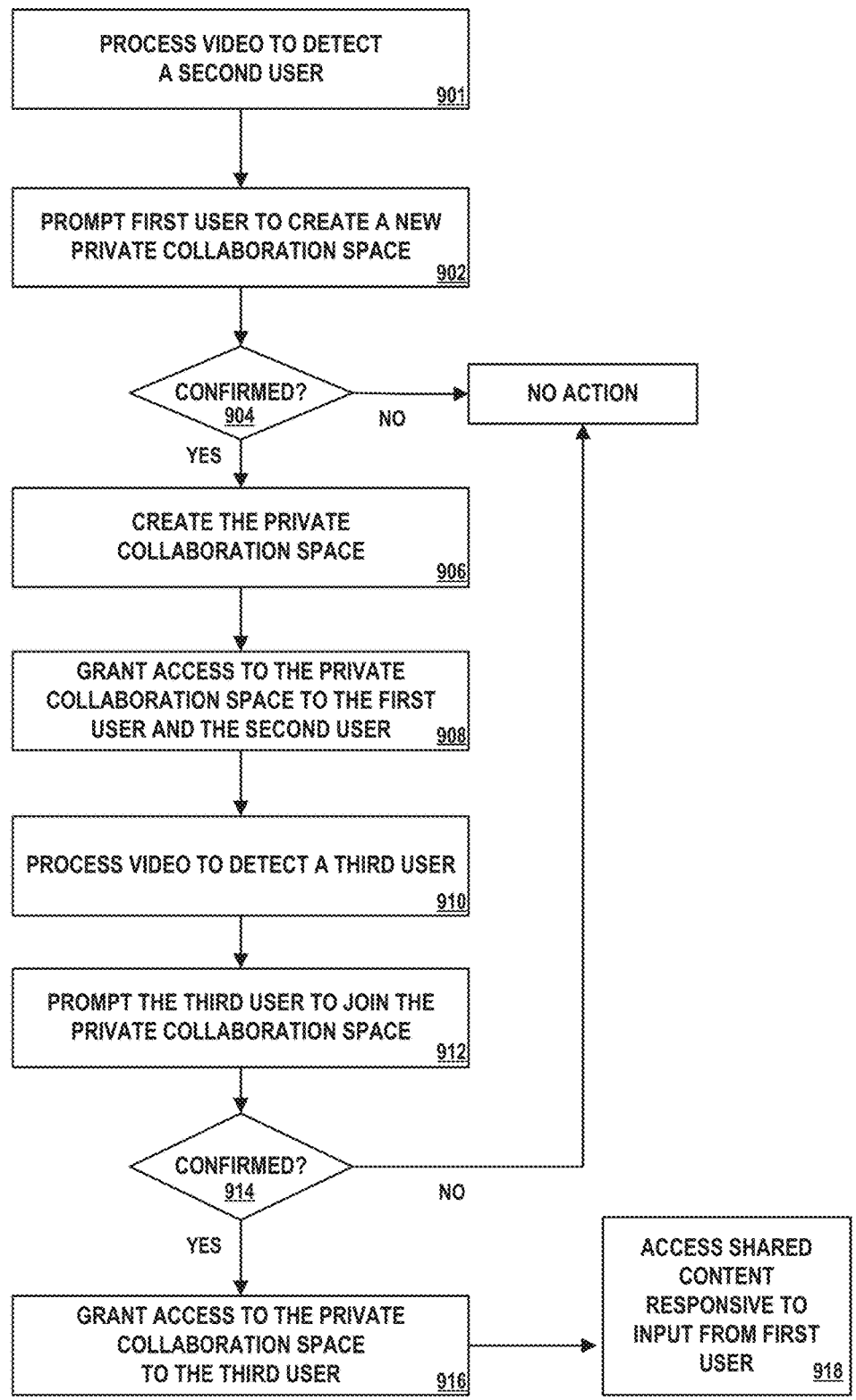
FIG. 5 is a flow diagram illustrating operations performed by an example computing system, in accordance with one or more aspects of the present disclosure.

FIG. 5 is a flow diagram illustrating operations performed by an example computing system, in accordance with one or more aspects of the present disclosure. FIG. 5 is described below within the context of computing system 100B of FIG. 1B. In other examples, operations described in FIG. 5 may be performed by one or more other components, modules, systems, or devices. Further, in other examples, operations described in connection with FIG. 5 may be merged, performed in a difference sequence, omitted, or may encompass additional operations not specifically illustrated or described.

In the process illustrated in FIG. 5, and in accordance with one or more aspects of the present disclosure, computing system 100B processes image data, generated by an image capture system of HMD 112A, to detect user 101B in the image data (901). In response to detecting user 101B, HMD 112B outputs a prompt to user 101A to create a new private collaboration space (902). If computing system 100B detects a confirmation input by user 101A, e.g., a gesture or utterance (YES branch of 904), computing system 100B creates the private collaboration space (906).

Computing system 100B then adds user 101B and user 101A to the private collaboration space to grant access to shared digital content to these users (910). For example, computing system 100B may update an access control list associated with the private collaboration space based on an ID of the detected user, a centralized profile of the detected user or a visual fingerprint generated from the captured images of the detected user. Users 101A, 101B can upload, create, modify, access, etc., shared digital content in the private collaboration space.

Computing system 100B processes subsequent image data, generated by the image capture system of HMD 112A, to detect user 101C in the image data (910). In this example, in response to detecting user 101C, HMD 112C outputs a prompt to user 101C to join the private collaboration space with users 101A and 101B. If user 101C declines, e.g., with a decline input, gesture, or utterance (NO branch of 914), computing system 100B takes no action. If user 101C confirms (YES branch of 914), computing system 100B adds user 101C to the private collaboration space to grant access to shared digital content to user 101C (910). For example, computing system 100B may update an access control list associated with the private collaboration space based on an ID of the detected user, a centralized profile of the detected user or a visual fingerprint generated from the captured images of the detected user.

Upon gaining access, computing system 110B and, in some examples, computing devices associated with users 101A-101C enable the users to upload, create, modify, access, etc., shared digital content in the private collaboration space (918). As one example, one or more of users 101A-101C may interact with an artificial reality environment via an artificial reality system, such as described herein, to access, manipulate or otherwise share digital content.

The process of FIG. 5 illustrates one example mode of operation of a computing system in accordance with the techniques described herein. Similarly, the computing system may operate in other modes to provide visually-driven access control of private collaboration spaces, by enabling or disabling access by one or more detected user(s) to an existing collaboration space.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some examples, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

What is claimed is:

1. A computing system comprising:
  a video processing engine comprising processing circuitry and configured to receive, from an image capture system of a head-mounted display (HMD) worn and controlled by a first user, first image data and second image data captured by the image capture system, wherein the first image data is representative of a second user, the second user is in direct visual proximity to the first user, the second image data is representative of a third user, the third user is in direct visual proximity to the first user, the second user is not in direct visual proximity to the third user, and the second user is in transitive visual proximity to the third user via the first user; and
  wherein the video processing engine is configured to analyze the first image data to identify the second user, and to analyze the second image data to identify the third user; and
  a collaboration application configured to:
    create a private collaboration space for the first, second, and third users,
    share, via the private collaboration space, a first set of digital content based on the direct visual proximity, and
    share, via the private collaboration space, a second set of digital content based on the transitive visual proximity.

2. The computing system of claim 1,
  wherein the collaboration application is configured to, in response to identification of the second user, automatically create the private collaboration space for a set of users comprising at least the first, second, and third users.

3. The computing system of claim 1,
  wherein the collaboration application is configured to determine a type of visual proximity between any of the first, second, or third users; and
  wherein the collaboration application is configured to constrain, based on a determination the type of visual proximity is transitive visual proximity, access to shared digital content via the private collaboration space based on a type of the shared digital content.

4. The computing system of claim 1,
wherein the collaboration application is configured to detect, from the first image data, a confirmation gesture performed by the second user, and
wherein the collaboration application is configured to require a detection of a confirmation gesture performed by the second user prior to adding a second user profile to a set of authorized user profiles associated with the private collaboration space.

5. The computing system of claim 1, further comprising:
an audio processing engine configured to detect, from audio data, a confirmation statement uttered by the second user,
wherein the collaboration application is configured to require a detection of a confirmation statement uttered by the second user prior to adding, a second user profile to a set of authorized user profiles associated with the private collaboration space.

6. The computing system of claim 1,
wherein the third user is located in a second physical environment that is separate from a first physical environment in which the first user and the second user are located,
wherein the collaboration application is configured to create a visual proximity graph for the private collaboration space for a set of users comprising at least the first, second, and third users the visual proximity graph comprising a first node for the first user, a third node for the third user, and a first edge connecting the first node and the third node to denote that the first user and the third user are in direct visual proximity, and
wherein the collaboration application is configured to modify, in response to identification of the second user, the visual proximity graph to include a second node for the second user and a second edge connecting the second node and the third node to denote that the second user and the third user are in transitive visual proximity.

7. The computing system of claim 6,
wherein the collaboration application is configured to, based on the modified visual proximity graph, add a user profile corresponding to the identified second user to a set of authorized user profiles associated with the private collaboration space,
wherein the private collaboration space enables the second user and third user to access shared digital content via the private collaboration space,
a collaboration application configured to add, in response to identification of the second user, a user profile corresponding to the identified second user to a set of authorized user profiles associated with a private collaboration space in which a set of users with authorized user profiles are permitted to access the shared digital content, wherein the set of users includes the first user.

8. The computing system of claim 1, wherein the direct visual proximity comprises one or more of: a direct line of sight visual path, or a visual path that includes an electronic display screen.

9. The computing system of claim 1, further comprising:
an identification database comprising a user profile for the second user, the user profile for the second user comprising a facial fingerprint for the second user, and
wherein, to identify the second user, the video processing engine is configured to match the first image data to the facial fingerprint for the second user.

10. The computing system of claim 1, further comprising:
an identification database comprising a user profile for the second user, the user profile for the second user comprising a user identifier for the second user, and
wherein, to identify the second user, the video processing engine is configured to match an identification code represented in the first image data to the user identifier for the second user.

11. The computing system of claim 1,
wherein the first user is located in a second physical environment separate from a first physical environment in which the second user is located, and
wherein the first image data includes images of a video communication system that is displaying images of the first physical environment.

12. The computing system of claim 11,
wherein the third user is located in the second physical environment.

13. The computing system of claim 1,
wherein the first set of digital content comprises one or more of a message, artificial reality content, files, a digital whiteboard, or a digital object.

14. The computing system of claim 1,
wherein the first set of digital content comprises artificial reality content, the system further comprising:
a rendering engine configured to render, for display at the HMD worn by the first user, the artificial reality content.

15. The computing system of claim 1,
wherein a first set of users comprises at least the first and second users,
wherein the private collaboration space is a first private collaboration space,
wherein the first set of digital content and second set of digital content is first shared digital content, and
wherein the video processing engine is configured to:
detect, from third image data captured by the image capture system, the second user is no longer in direct visual proximity with the first user;
detect, from the third image data, that the third user is in direct visual proximity with the first user and analyze the third image data to identify the third user; and
wherein the collaboration application is configured to:
determine, in response to identification of the third user, a user profile corresponding to the identified third user, initiate creation of a second private collaboration space, and link the user profile for the third user to a set of authorized user profiles associated with the second private collaboration space in which a second set of users with authorized user profiles are permitted to access second shared digital content, wherein the second set of users includes the first user.

16. The computing system of claim 15,
wherein the first user is concurrently in the first set of users associated with the first private collaboration space and in the second set of users associated with the second private collaboration space.

17. The computing system of claim 1, further comprising:
a gesture detector configured to detect, from third image data captured by the image capture system, a gating gesture by the first user,
wherein the collaboration application is configured to switch, in response the gating gesture, to add user mode,
wherein the collaboration application is configured to add, only if the collaboration application is in add user mode, the second user to the set of users associated with the private collaboration space.

18. The computing system of claim 1,
wherein the collaboration application is configured to present, in response to receiving the digital content from the first user, the first digital content to the second user.

19. A method comprising:
receiving, by a computing system from an image capture system of a head mounted display worn and controlled by a first user, first image data and second image data captured by the image capture system, wherein the first image data is representative of a second user, the second user is in visual proximity to the first user, the second image data is representative of a third user, the third user is in direct visual proximity to the first user, the second user is not in direct visual proximity to the third user, and the second user is in transitive visual proximity to the third user via the first user;
analyzing, by the computing system, the first image data to identify the second user;
analyzing, by the computing system, the second image data to identify the third user;
creating, by the computing system, a private collaboration space for the first, second, and third users;
sharing, by the computing system via the private collaboration space, a first set of digital content based on the direct visual proximity; and
sharing, by the computing system via the private collaboration space, a second set of digital content based on the transitive visual proximity.

20. A non-transitory computer-readable medium comprising instructions for causing processing circuitry of a computing system to perform operations comprising:
receive from an image capture system of a head mounted display worn and controlled by a first user, first image data and a second image data captured by the image capture system, wherein the first image data is representative of a second user, the second user is in visual proximity to the first user; the second image data is representative of a third user, the third user is in direct visual proximity to the first user, the second user is not in direct visual proximity to the third user, and the second user is in transitive visual proximity to the third user via the first user;
analyze the first image data to identify the second user;
analyze the second image data to identify the third user;
create a private collaboration space for the first, second, and third users;
share, via the private collaboration space, a first set of digital content based on the direct visual proximity; and
share, via the private collaboration space, a second set of digital content based on the transitive visual proximity.

* * * * *